United States Patent [19]

Enser et al.

[11] 4,239,151
[45] Dec. 16, 1980

[54] METHOD AND APPARATUS FOR REDUCING THE NUMBER OF REJECTED DOCUMENTS WHEN READING BAR CODES

[75] Inventors: Mats A. Enser; Nils G. Stalberg, both of Lidingö, Sweden

[73] Assignee: International Business Machines Corporation, Armonk, N.Y.

[21] Appl. No.: 31,656

[22] Filed: Apr. 19, 1979

Related U.S. Application Data

[63] Continuation of Ser. No. 902,468, May 3, 1978, abandoned.

[51] Int. Cl.³ .................. G06K 5/00; G06K 7/08; G06K 7/10; G11B 25/04
[52] U.S. Cl. .................. 235/437; 235/449; 235/462; 360/2; 360/40
[58] Field of Search .......... 235/449, 450, 437, 462, 235/463, 494; 360/2, 40, 44; 250/555, 566, 568

[56] References Cited

U.S. PATENT DOCUMENTS

| | | | |
|---|---|---|---|
| 3,610,891 | 10/1971 | Raciazek | 235/463 |
| 3,700,858 | 10/1972 | Murthy | 235/463 |
| 3,723,710 | 3/1973 | Crouse et al. | 235/463 |
| 3,731,064 | 5/1973 | Berler et al. | 235/463 |
| 3,755,654 | 8/1973 | Dellacato | 235/463 |
| 3,909,787 | 9/1975 | Laurer et al. | 235/462 |
| 4,053,737 | 10/1977 | Lafevers et al. | 235/449 |

*Primary Examiner*—Daryl W. Cook
*Attorney, Agent, or Firm*—James E. Murray

[57] ABSTRACT

This specification describes apparatus for reading and decoding data encoded in terms of the spacing between adjacent code bars on a document. The apparatus contains reading means for producing an electrical pulse for each bar recorded on the document as the bar passes the reading element. A counter is used to measure the time between each two pulses and the resultant counts are stored in a memory in the order in which the pulses were produced by the reading means. A microprocessor then compares this stored data with microcoded data representative of properly coded digits. If there is a compare the stored data is shifted out of the memory and into a computer for use. However if there is a no-compare the microprocessor alters the data on the assumption that a particular type of error has occurred and again compares the modified data with the microcoded data. If this results in a compare the modified data is again read out and into the using computer. However if it again results in a no-compare, the processor modifies the stored data a second time on the basis of another assumption and this newly modified data is compared with microcoded data. These successive data modifications and their comparisons to the microcoded data continue until a compare occurs or it is apparent that the encoded data is not retrievable by the decoding apparatus.

7 Claims, 7 Drawing Figures

METHOD AND APPARATUS FOR REDUCING THE NUMBER OF REJECTED DOCUMENTS WHEN READING BAR CODES

This is a continuation of application Ser. No. 902,468 filed May 3, 1978, now abandoned.

BACKGROUND OF THE INVENTION

In modern information processing it is a normal practice to automatically read data from a document and transfer it directly to a data processing system. An example of such a document would be a bank check where the data is coded in a bar code such as the well known CMC 7-code where the data is stored in terms of the spacing between the bars on the check. The preferred procedure is to have the check read by a magnetic character reader and read data automatically transferred to a data processing system.

One problem encountered in reading data on a document and especially in connection with reading data encoded in a magnetic bar code is the difficulty in correctly decoding the read information. Many times this is due to variables introduced by the character reader in producing the electrical data to be decoded. For instance, when the magnetic head of the character reader reads a bar it normally produces one pulse. That pulse is generated when the magnetic head detects the trailing edge of the bar. However, sometimes two pulses are produced instead of one pulse; one pulse when the magnetic head detects the leading edge of the bar and the other when the magnetic head detects the trailing edge of the bar. Another example would be variations in pulse spacings caused by fluctuations in the operating speed of the document feed mechanism. There are a number of other variations caused by the character reader but not matter what the cause, these variations are a considerable problem in interpretation of magnetically encoded data.

The prior art has addressed this problem. In U.S. Pat. No. 3,781,799 a sensed CMC 7-code is decoded by temporarily storing the bar data and by comparing this data with a reference signal. This method makes the detected bar code less sensitive to the documents' feeding speed. Furthermore British Pat. No. 1,452,661 discloses another method for improving the decoding in automatic character reading. Here the read character pattern is compared with two different reference patterns. If either of these reference patterns is the same as the detected pattern, then the character pattern will be accepted. Neither one of these solutions is entirely satisfactory.

Therefore, it is an object of this invention to provide a method and a device for reading and decoding bar codes.

Another object of the invention is to provide a device not requiring a high precision for reading and decoding a bar code.

Another object of the invention is to provide a device which can decode a bar code and transfer the decoded information to a central system.

Still another object of the invention is to provide a method for reading and decoding a bar code whereby the recorded information contains typical errors.

Another object of the invention is to provide a bar code reader which eliminates noise in a form of very thin bar spots.

Still another object of the invention is to provide a bar code reader which is nonsensitive to speed variations in document feeding.

Another object of the invention is to reduce the number of unaccepted documents when reading and decoding recorded bar codes, when a number of typical errors can occur when reading the records on the document.

Still another object of the invention is to provide a device for reading and decoding a magnetic bar code.

THE INVENTION

The above objects are accomplished by improved apparatus for reading and decoding data stored in terms of the spacing between adjacent bar codes on documents. The apparatus contains reading means for producing an electrical pulse for each bar recorded on the document as the bar passes the reading element. A counter is used to measure the time between each two pulses and the resultant counts are stored in a memory in the order in which the pulses were produced by the reading means. A microprocessor then compares this stored data with microcoded data representative of properly coded digits. If there is a compare the stored data is shifted out of the memory and into a computer for use. However if there is a no-compare the microprocessor alters the data on the assumption that a particular type of error has occurred and again compares the modified data with the microcoded data. If this results in a compare the modified data is read out and into the using computer. However if it again results in a no-compare, the processor modifies the stored data a second time on the basis of another assumption and the newly modified data is compared with the microcoded data. These successive data modifications and their comparison to the microcoded data continues until a compare occurs or it is apparent that the encoded data is not retrievable by the decoding apparatus.

The characteristic features of the invention will be evident from the attached claims.

THE DRAWINGS

The invention will now be described in connection with the following figures.

DETAILED DESCRIPTION

Figure 1:
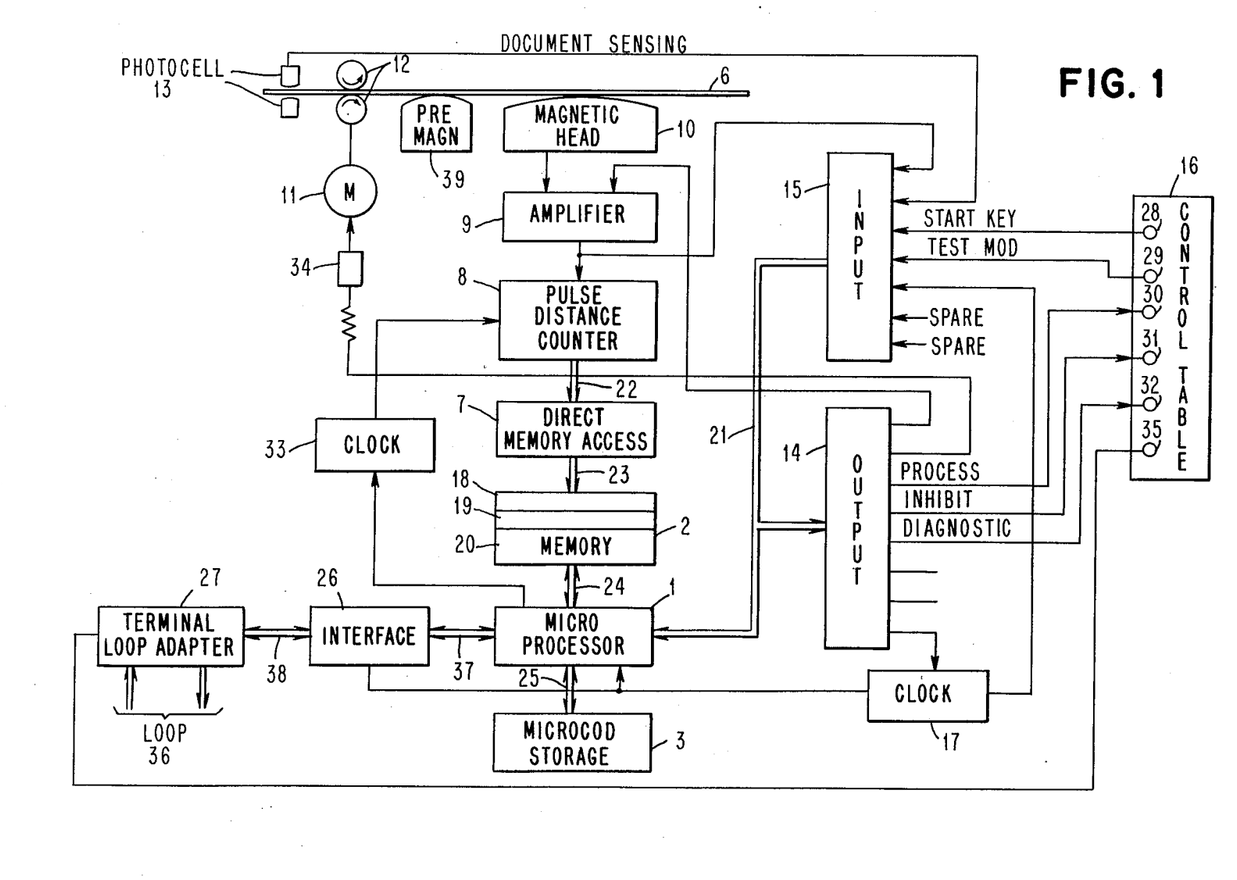
FIG. 1 is a block diagram of the device according to the invention.

Referring first to FIG. 1, a document 6 is magnetically coded in a CMC 7-code. A synchronous motor 11 by means of a driving device 12 feeds the document into a reading station with a magnetic head 10. The magnetic head 10 is connected to an amplifier 9, which is connected to a pulse distance counter 8. A clock 33 is connected to the counter 8. The counter 8 is connected by means of a data line 22 to a direct memory access circuit 7, which in turn is connected by means of another data line 23 to a memory 2. The memory 2 has in input buffer 18, a register field 19 and an output buffer 20. The memory 2 is connected by line 24 to a microprocessor 1, which is connected by line 25 to a microcode storage 3. The microprocessor 1 is connected by a transmission line 21 to input gate circuits 15 and to output circuits 14 and further by data line 37 to interface circuits 26. The interface circuits 26 are connected by a data line 38 to a terminal loop adapter 27, which is connected to a data transfer loop 36.

The input and output circuits 14 and 15 are connected to control table 16, which comprises switches 28 and 29, and indicator lamps 30, 31, 32 and 35, said circuits being further connected to a sensing photo cell 13. The output latch circuits 14 are connected to a start relay 34 and to a clock 17, said clock being connected to said input gate circuits 15, and to the microprocessor 1.

The operation of the device shown in FIG. 1 will now be explained in connection with FIGS. 1-5.

A document 6 magnetically coded in a CMC 7-code, is manually placed in the input of a reading station. When the photodetector 13 detects that document, a signal from the photodetector 13 is transmitted through input gate 15 and the line 21 to the microprocessor 1. The microprocessor 1 will provide a start signal on the line 21 to the output circuit 14 and the start relay 34 in synchronism with an interrupt signal to the microprocessor 1 from a clock 17. The start relay 34 will then connect a synchronous motor 11 to an AC power source. This will activate the document feeding device 12 so that the document 6 can be fed into the reading station. The magnetic indicia on the document will first pass through an energizing station 39 comprising permanent magnets which will activate the magnetic indicia. Then the magnetic indicia will pass the magnetic head 10, which will sense the recorded magnetic data.

Figure 2:
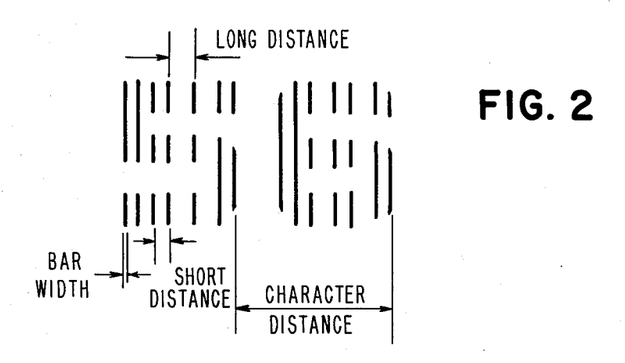
FIG. 2 is an example of two typical characters according to a CMC-7 code.

Two typical CMC 7-characters 5 and 6 are shown in FIG. 2. Each character comprises several vertical bars whih are separated by means of six intervals. These intervals are two long intervals and four short ones. A short interval can, for instance, be 0.3 mm and the long interval 0.5 mm. The bar width is preferably between 0.10 and 0.19 mm.

When the magnetic bars pass the magnetic head 10 the information contained in the magnetized bars will be sensed. The reading signals from the magnetic head 10 will be transferred to an amplifier 9. The amplifier 9 is conventional and is not a direct part of the present invention. It is only essential that the amplifier 9 does not need to be a precision amplifier. Preferably this amplifier comprises a preamplifier, a bandpass filter, a logarithmic compression circuit, a pulse detector and a digital pulse former. Normally the amplifier detects all bar signals from the magnetic head and generates an output signal for each bar.

The output signal from the amplifier 9 is transferred to the pulse distance counter 8 which evaluates the distance between the various bars on the document. The pulse distance counter 8 operates in such a way that the high speed clock 33 continuously provides pulses to the counter and steps the counter forward. When a signal generated by the magnetic head is supplied from the amplifier 9 the counter will stop. Then the count of the counter 8 is transferred over the line 22 to the direct memory access circuit 7 and further over the transfer line 23 to the ring buffer 18 in the memory 2. The direct memory access circuit 7 provides direct data transfer from the pulse counter 8 to the memory without the need of the microprocessor 1 to control this transfer by means of program interrupt. This direct memory access method is conventional and operates according to a cycle steal principle when the microprocessor 1 first has initiated this transfer routine.

Figure 3:
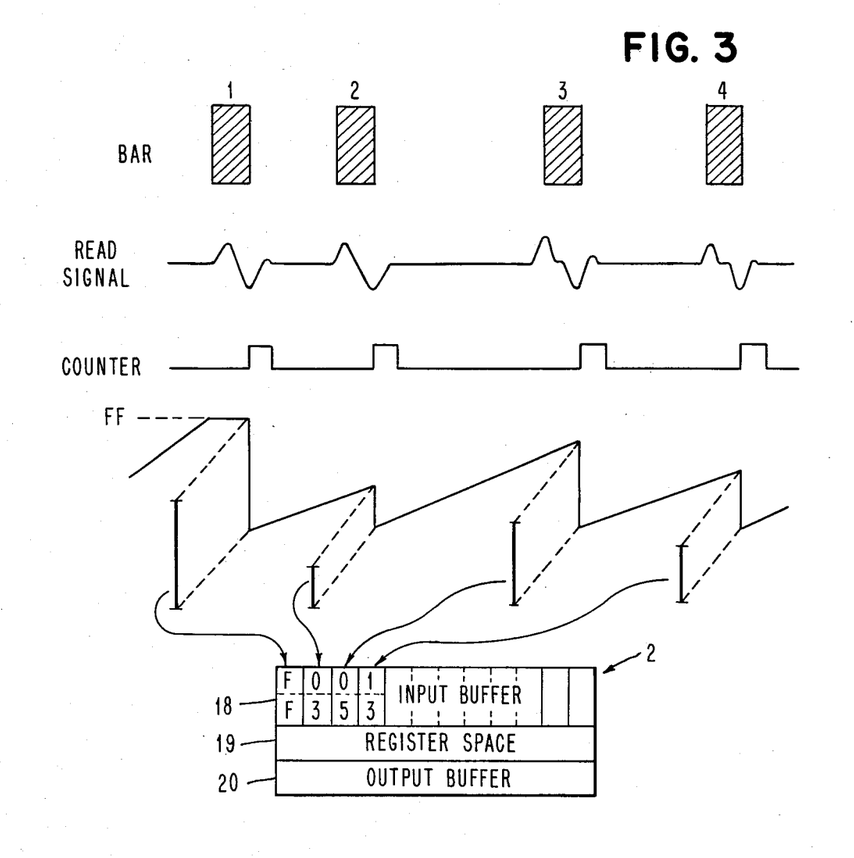
FIG. 3 is a functional description of the counter and the ring buffer of FIG. 1.

Referring now to both FIGS. 1 and 3, it can be seen that before any bar is sensed the counter 8 is stepped by means of pulses from the clock 33 to a maximum count value FF. When the first magnetic bar is sensed on the document a count value FF is transferred over the direct memory access circuit 7 to the first position of the ring buffer 18 and also the counter will be reset to zero. The clock pulses will again be fed into the counter until the second bar 2 is sensed. The spacing between bar 1 and bar 2 is short resulting in a count of 30. This value 30 is transferred to the second position of the ring buffer and the counter again is reset. The spacing between bars 2 and 3 is long and results in a count of 50 being placed in position 4 of the input buffer while a count of 31 is placed in the fifth position of the buffer as a result of the short period between bars 3 and 4. In this way the periods between bars is stored in the memory in a step by step fashion. An example of typical values for such an operation would be a document feeding speed of 400 mm per second where the clock 33 operates with a frequency of 64 KHz and clock 17 with a frequency of 0.4 KHz.

The microprocessor 1 analyzes the information in buffer 18 by means of microcode data stored in the microcode storage 3. When the microprocessor has analyzed and decoded a character in the input buffer 18 it will be transferred to the output buffer 20 which also operates as a ring buffer. The input buffer 18 is reset after the bar data has been decoded and transferred from it to the output buffer 20. From the output buffer 20 data is transferred through the microprocessor 1 to interface circuits 26 over transfer line 37 and over another transfer line 38 to the terminal loop adapter 27. From this adapter data is placed in loop 36 for use in a central processing system.

Figure 4:
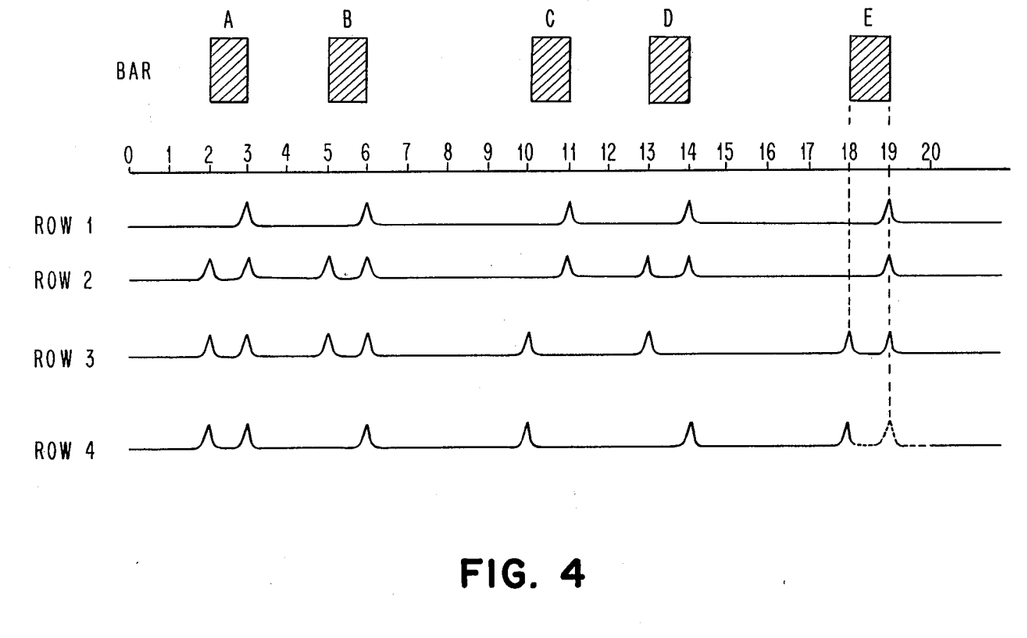
FIG. 4 is a timing diagram disclosing various sense signals.

FIG. 4 shows the variation in read signals that can be produced by the magnetic read head from bars A, B, C, D and E. In line 1 the amplifier 9 is shown as provided a proper output signal on occurrence of the trailing edge of each bar. However sometimes double output signals are produced as shown on line 2. A third variation is shown on line 3 where the magnetic head provides double pulses for some bars and at the same time produces single pulses associated with the leading edge of the bar instead of the trailing edge. Finally line 4 reflects a case where the leading edges and the trailing edges for the bars both produce read pulses from the magnetic head.

The microprocessor 1 must decode input data in the input buffer 18 in light of the various possibilities that are shown on lines 1-4 of FIG. 4. In doing this the microprocessor first compares the data to microcoded data stored in the microcoded storage to test whether the character data in the buffer 18 has been properly detected such as was the data on line 1 of FIG. 4. If this is the case, the character will be decoded and transferred to the output buffer 20. If the data has not been properly detected this first decoding will not provide a positive result. The microprocessor will then try to decode the character information by making the assumption that there are two pulses for every bar and only the latter one is valid. This means that the first one of each two adjacent pulses will be deleted and the count associated with the short distance between each two adjacent pulses will be added to the count stored just prior to the count associated with the distance between each two adjacent pulses. If this will result in valid decoding the character will be transferred to the output buffer 20. However if the character information is not of the type shown on line 2, then the second decoding will also result in an error and a third decoding of the data is necessary. When the third decoding is performed the second one of each two adjacent pulses will be deleted and the count representing the distance between them will be added to the count recorded just after the deleted count. If this results in a compare with data in the microcode storage the modified data will be a valid character which will be transferred to the output buffer 20. This third decoding may also end in failure and if it does a fourth attempt is made at decoding the data. An information pattern of the type shown on line 4 is more difficult to decode than the previously described patterns. It is a combination of line 2 and 3 containing leading edge, trailing edge and double pulses. However, it is possible to make some assumptions and to decode such an information pattern. Furthermore, there may be more than one possible combination of known errors and each of these known combinations could be set forth in a separate decoding step. This makes it possible to analyze the information in the input buffer 18 step by step and then to successively decode that information when certain presupposed errors occur in the reading signals.

There is an advantage in the input buffer 18 being a ring buffer since the decoding of distance data does not occur in synchronism with the transfer of the data from the counter 8 to the input buffer 18. When the data contains a high percentage of errors, the decoding will be slower than if distance data is error free. Therefore the amount of data stored in the buffer will vary with the number of errors incurred in reading the data.

Figure 5:
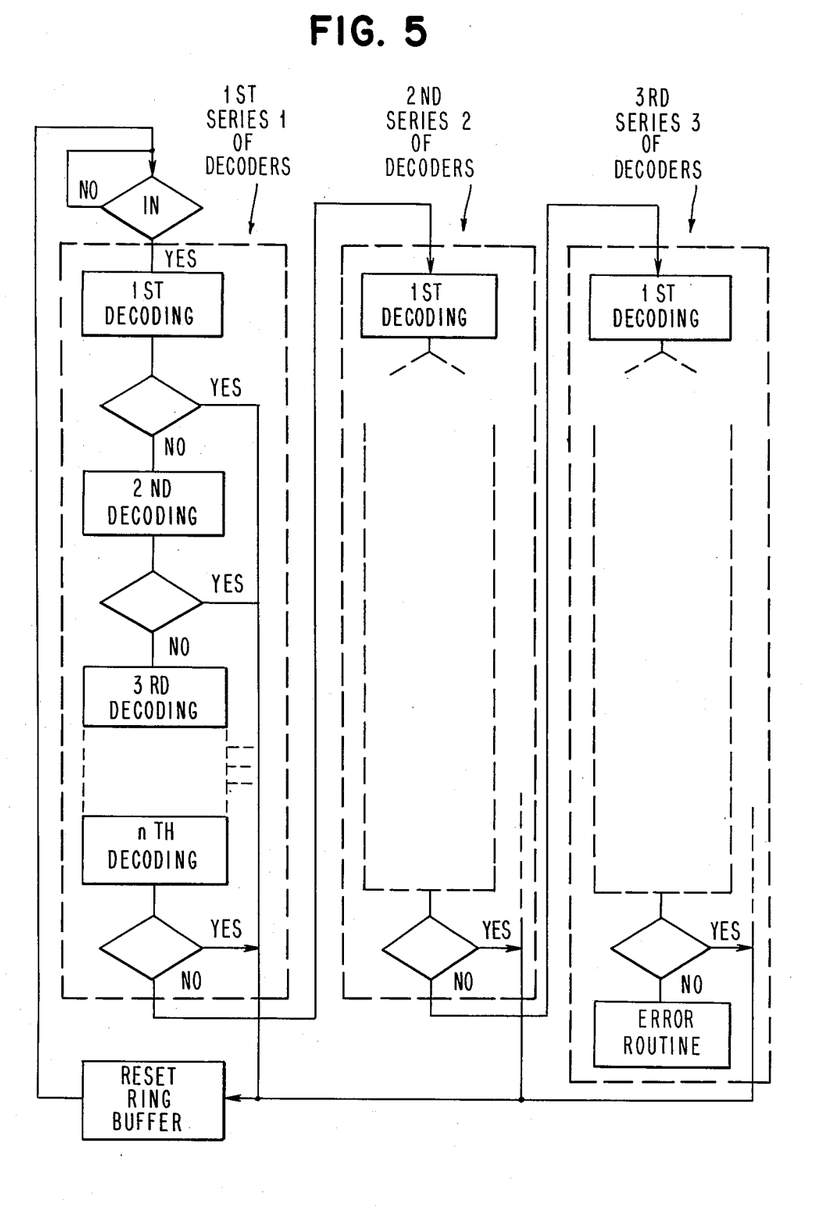
FIG. 5 is a flow charge for a bar interval decoding.

FIG. 5 is a flow chart for the decoding of the information in the input buffer 18. Starting with an input analysis the decoding will first proceed with the assumption that the data is error free like the data shown in line 1 in FIG. 4. If this first decoding of the first series of decoding steps provides a positive result, the yes-line will come up resetting the ring buffer. Decoding can then begin on a second string of data bits however if the first decoding results in a negative decision, one will proceed to a second decoding of the first series of data bits making the assumption of the type of error shown on line 2 of FIG. 4. If the second decoding provides a positive result it will reset the ring buffer so that the apparatus can proceed to decode the second string of data bits. However if this is not the case the apparatus can continue through the four separate decoding steps discussed above looking for a positive result. If none of these decoding steps provides a positive result at the end of series, the apparatus will begin decoding using an identical set of four decoding steps. However, here the data is examined using an assumption that a different type of error existed in the original data bits. The assumption is that the distance intervals between the various bars are shorter than normal. For instance it would be assumed that the short reference interval has a value 25 instead of the normal value 30 and that the long reference interval has a value 45 instead of 50. The microprocessor 1 will then proceed with this second series of decodings of the same data using a shorter set of reference intervals stored in the microcode storage 3. If this second series of decoding does not provide a positive result, then the decoding proceeds to a third series of decodings. The third series of decodings differs from the previous series in that the distances between the bars are assumed to be longer than normal. For instance, it could be assumed that the short reference interval would be 35 instead of 30 and the long interval would be 55 instead of 50.

If the end step of third series of decodings leads to a negative result an error routine follows.

The advantage of the second series and the third series of decoding steps is that the decoding of bar information will be dynamic. This means some mechanical variations in the speed due to the driving synchronous motor for the document feeding can be compensated for. Generally speaking it can be said that the system allows the use of lower tolerance for the mechanical and electrical apparatus used in the magnetic record reading arrangement.

A suitable manner of correcting reference distance interval data is to add up all distance data for a sensed character and to compare the same with the sum for normal distance data in a character. Then new reference data will be established for short and long intervals by taking into consideration this comparison value.

Figure 6:
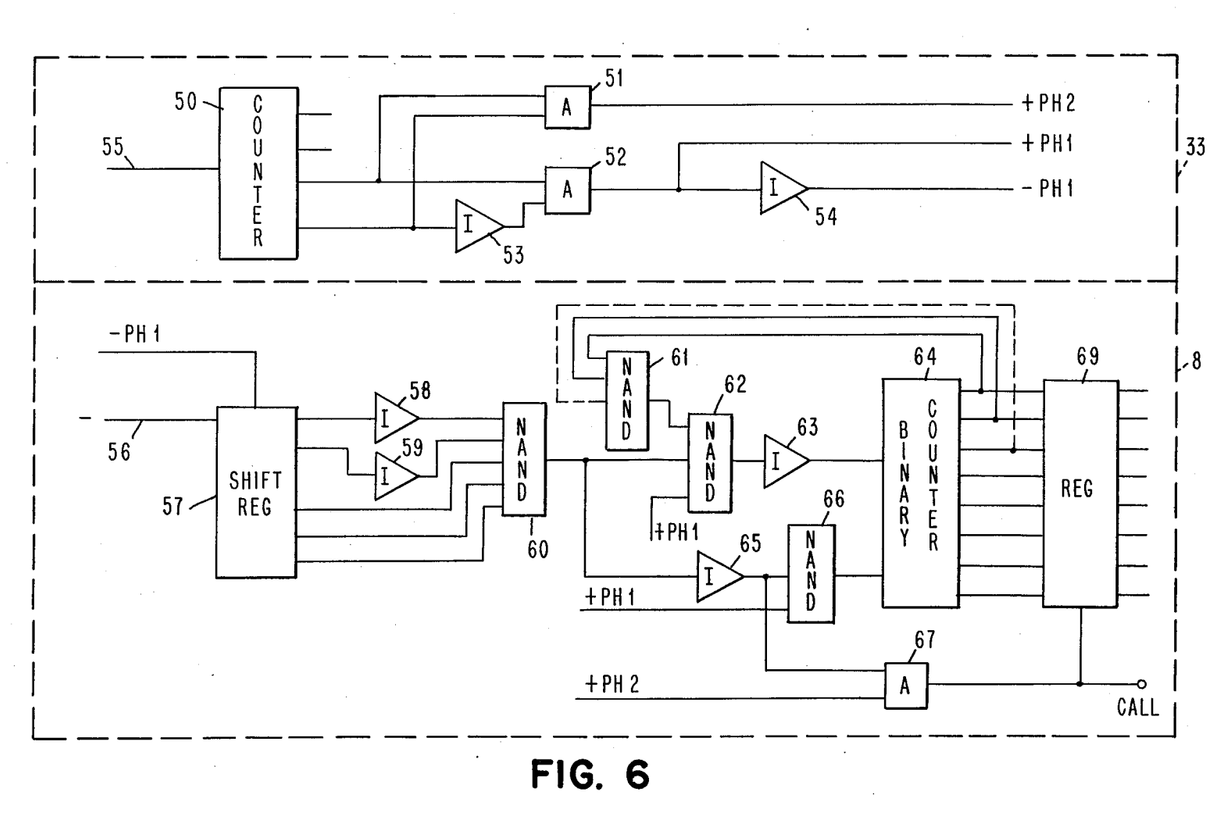
FIG. 6 is a detailed logic diagram of the counter according to FIG. 1.
Figure 7:
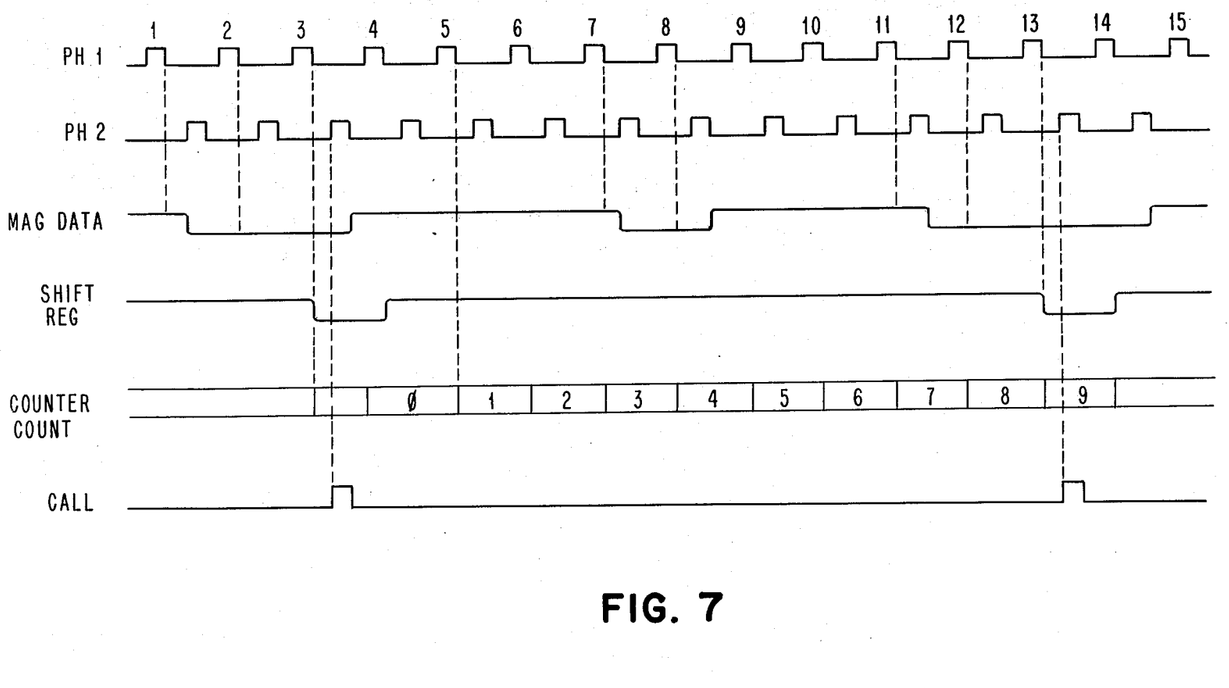
FIG. 7 is a timing diagram for the counter according to FIG. 6.

In FIG. 6 the clock 33 is connected to the oscillator for the microprocessor 1 and receives system clock pulses of a frequency of 1 megacycle over line 55. These pulses are fed into a binary counter 50. The output of the binary counter 50 is combined in AND circuits 51 and 52 and in inverter circuits 53 and 54 in such a way that new clock pulses with a lower frequency are provided. These new clock pulses are called +PH2, +PH1 and −PH1 and are shown in FIG. 7.

As shown in FIG. 6 distance counter 8 comprises a shift register 57 receiving magnetic reading data from the amplifier 9 in FIG. 1 over a line 56. The shift register will be stepped by signals from the clock 33 by using the −PH1 signal line.

The shift register 57 operates as a delay circuit having its first two outputs connected to two inverting circuits 58 and 59. Only magnetic data signal on line 56 which has sufficient duration can switch a NAND circuit 60 so that another NAND circuit 62 and an inverter circuit 63 can be activated. A binary counter 64 counts distance intervals between the sensed bars. As long as the NAND circuit 60 is activated from the shift register 57 the clock signal PH1 will step the binary counter 64 thru the NAND circuit 62 and the inverter circuit 63. When a stop signal is received from the shift register 57 and gate 60 the stepping of the counter 64 is stopped by signals from the gate circuits 62 and 63. Then the inverter circuit 65 and the NAND circuit 66 will reset the binary counter 64, simultaneously with transfer of its contents to register 69. In connection to the reset and transfer operation an AND gate 67 by means of clock signal PH2 sends a calling signal to the direct memory access circuit 7 for receiving the distance data from the register 69.

If the distance between two bars exceeds a given higher threshold value (FF) the binary counter 64 is automatically stopped by means of a feedback signal from NAND circuit 61 which feeds the gate 62.

In FIG. 7 a downgoing magnet data signal produces a shift register output that switches the NAND gate 60 after two PH1 clock pulses. This occurs at the trailing edge of the third PH1 signal and results in a call from AND circuit 67 starting the binary counter 64. It can be seen that the short magnetic data pulse at PH1 value 8 will not effect the binary counter 64. However the long magnetic data signal at PH1 pulses 12 and 13 will stop the binary counter 64 and initiate a calling signal to the direct memory access circuit. This arrangement prevents short magnetic pulses such as noise signals from stopping counter 64.

In accordance with FIG. 1 the operator can set the device into test mode by means of a switch 29 on the control table. The microprocessor 1 will then initiate a number of test signals to amplifier 9 through the output gate areas. The test result can either be analyzed by circuits 8, 7 and 2 or the output of the amplifier 9 can be directly sensed by the microprocessor 1 through the input gates 15. The test mode is indicated by an indicator lamp 32.

The purpose of the indicator lamp 35 is to indicate the availability of the loop 36.

The process indicator lamp 30 is used to indicate that data in buffer 20 is available for sending to the terminal loop 36.

The inhibit indicator lamp 31 is used to indicate that the buffer in the memory 2 is full. The motor 11 then stops feeding new documents until data from the output buffer is sent to the outer loop 36.

From the description of the preferred embodiment of the invention one skilled in the art will recognize a variety of applications for the invention and appropriate modifications within the scope of the claims.

Having thus described our invention, what we claim as new, and desire to secure by Letters Patent is:

1. A method for reducing the number of rejected documents when reading and decoding character information recorded on a document in a bar code based on the distance between adjacent bars comprising:
   producing electrical pulses representing the bars by feeding the document containing the bars passed a reading means,
   counting the time between each two pulses with a counter and storing the counts produced by the counter in strings representating individual characters where the counts are positioned in the string in the order in which the related pulses were produced by the reading means,
   performing a plurality of decoding steps each involving comparing each string of counts with valid combinations of counts, the first step using the unmodified stored string in the comparison on an assumption that there are no errors in counts, the second step using a first modification of the stored string in the comparison on an assumption that a correctable error of a first type exists in the counts, the third step using a second modification of the stored string in the comparison based on an assumption that a correctable error of a second type exists in the counts, interrupting the decoding at any step producing a valid decoding of a character, and transferring such a valid decoding to user means.

2. Method according to claim 1 including assuming that the error type in one of said steps is an extra pulse located before and adjacent to a valid pulse, and correcting the error during one of said steps by adding of the two counts before said valid pulse.

3. Method according to claim 1 including assuming that the error type on one of said steps is an extra pulse located after a valid count, and correcting that error during one of said steps by adding of the two counts after said valid count.

4. Method according to claim 1 including assuming that the error type assumed in at least one of said steps means is that the time between the pulses is different than the normal time between pulses, and correcting that error during said at least one of said steps by changing the valid combinations of counts.

5. Method according to claims 1, 2 or 3 including performing the plurality of decoding steps in three series, the first series using a normal count in the valid combination, the second series using higher countes in the valid combination and a third series using lower counts in the valid combination.

6. In a character reader for reading character information recorded on a document in a bar code based on the distance between adjacent bars comprising:
   means for producing electrical pulses representing the bars at time intervals representing their spacings on the document;
   means for counting the time between each two pulses;
   storage means for storing the counts in strings representing individual characters where the counts are positioned in the string in the order in which the pulses were produced by the reading means;
   and processor means for performing a plurality of decoding steps on said strings including comparing the strings as stored in the storage means with the valid combinations in a step, comparing strings with counts that are modified based on an assumption or a particular type of error with a valid combination in another step and comparing strings with valid combinations that are modified based on an assumption of another type of error in yet a third step.

7. The character reader of claim 6 wherein said processor means includes means for modifying said strings on the assumption that there was an incorrect number of pulses and means for modifying the valid combination on the assumption that the time interval between all pulses is incorrect.

* * * * *